(12) United States Patent
Ichihara et al.

(10) Patent No.: US 7,923,134 B2
(45) Date of Patent: Apr. 12, 2011

(54) PERPENDICULAR MAGNETIC RECORDING MEDIUM, METHOD OF MANUFACTURING THE SAME, AND MAGNETIC RECORDING DEVICE

(75) Inventors: Takayuki Ichihara, Tokyo (JP); Masayoshi Shimizu, Kanagawa (JP)

(73) Assignee: Hitachi Global Storage Technologies Netherlands BV, Amsterdam (NL)

( * ) Notice: Subject to any disclaimer, the term of this patent is extended or adjusted under 35 U.S.C. 154(b) by 199 days.

(21) Appl. No.: 12/284,913

(22) Filed: Sep. 26, 2008

(65) Prior Publication Data
US 2009/0086372 A1 Apr. 2, 2009

(30) Foreign Application Priority Data

Sep. 28, 2007 (JP) ................................ 2007-255602

(51) Int. Cl.
*G11B 5/66* (2006.01)
*G11B 5/84* (2006.01)
(52) U.S. Cl. ..................... 428/828; 428/836.2; 428/829; 428/830; 360/131; 427/127; 216/22
(58) Field of Classification Search .......................... None
See application file for complete search history.

(56) References Cited

U.S. PATENT DOCUMENTS

| | | | |
|---|---|---|---|
| 6,014,296 A | 1/2000 | Ichihara et al. | |
| 6,391,430 B1 * | 5/2002 | Fullerton et al. | 428/212 |
| 6,583,957 B1 | 6/2003 | Takeshita et al. | |
| 6,660,357 B1 * | 12/2003 | Litvinov et al. | 428/827 |
| 7,422,808 B2 * | 9/2008 | Sugimoto et al. | 428/828.1 |
| 2002/0176214 A1 | 11/2002 | Shukh et al. | |
| 2002/0187368 A1 | 12/2002 | Senzaki et al. | |
| 2005/0141137 A1 | 6/2005 | Okada et al. | |
| 2005/0146992 A1 | 7/2005 | Inomata et al. | |
| 2006/0040140 A1 * | 2/2006 | Kaizu et al. | 428/829 |
| 2006/0124585 A1 | 6/2006 | Suwa et al. | |
| 2006/0204791 A1 * | 9/2006 | Sakawaki et al. | 428/828.1 |

(Continued)

OTHER PUBLICATIONS

Zheng et al. "Role of Oxygen Incorporation in Co-Cr-Pt-Si-O Perpendicular Magnetic Recording Media" IEEE Transactions on Magnetics, vol. 40, No. 4, Jul. 2004.

*Primary Examiner* — Kevin M Bernatz
(74) *Attorney, Agent, or Firm* — Daphne L. Burton; Burton IP Law Group (57) ABSTRACT

Embodiments of the present invention help to provide a discrete track medium for realizing a high track density in a low price by adopting a configuration, in which filling of a non-magnetic material into a guard band portion and smoothing processing of a medium surface are not required. According to one embodiment, a perpendicular magnetic recording medium, on the non-magnetic substrate, includes at least: a soft magnetic underlayer; a first recording layer including a crystal grain having a magnetic property and a non-magnetic grain boundary having an oxide, as a main component, surrounding the crystal grain; a second recording layer containing a ferromagnetic metal as a main component and not containing an oxide; and at least one non-magnetic layer provided between the first recording layer and the second recording layer. A recording track portion for magnetically recording information and a guard band portion provided between adjacent recording track portions are included in the perpendicular magnetic recording medium. The relationship between the total thickness t1 of the non-magnetic layer in the guard band portion and the total thickness t2 of the non-magnetic layer in the recording track portion is set as t1>t2.

16 Claims, 9 Drawing Sheets

U.S. PATENT DOCUMENTS

| | | | |
|---|---|---|---|
| 2007/0218318 A1* | 9/2007 | Watanabe | 428/832 |
| 2008/0070065 A1* | 3/2008 | Berger et al. | 428/828.1 |
| 2008/0144213 A1* | 6/2008 | Berger et al. | 360/110 |
| 2008/0218906 A1* | 9/2008 | Uchida | 360/131 |
| 2009/0123781 A1* | 5/2009 | Uchida | 428/827 |
| 2009/0123782 A1* | 5/2009 | Uchida | 428/828 |

* cited by examiner

|  | FIRST EMBODIMENT | SECOND EMBODIMENT | FIRST COMPARATIVE EXAMPLE | SECOND COMPARATIVE EXAMPLE |
|---|---|---|---|---|
| Log10 (BER) | - 6.2 | - 6.3 | - 6.3 | - 6.5 |
| Log10 (BER_ATI) | - 6.0 | - 6.1 | - 1.1 | - 1.0 |

PERPENDICULAR MAGNETIC RECORDING MEDIUM, METHOD OF MANUFACTURING THE SAME, AND MAGNETIC RECORDING DEVICE

CROSS-REFERENCE TO RELATED APPLICATION

The instant nonprovisional patent application claims priority to Japanese Patent Application No. 2007-255602 filed Sep. 28, 2007 and which is incorporated by reference in its entirety herein for all purposes.

BACKGROUND OF THE INVENTION

In recent years, as the range of application of a magnetic recording device, especially a magnetic disk drive, is extended, it is requested that the magnetic recording device be made smaller and have a larger capacity than before. In order to meet such request, it is essential to improve the recording density in a magnetic recording medium used in the device.

As a technique of increasing the linear recording density, a perpendicular magnetic recording method is widely used instead of a known longitudinal magnetic recording method. The perpendicular magnetic recording method is a method of forming a recording bit such that magnetization of a recording medium is performed in a direction perpendicular to a surface of the recording medium and magnetization of adjacent recording bits is performed in a direction antiparallel to each other. In the case of the perpendicular magnetic recording method is used, a demagnetizing field in a magnetization transition region is small. Accordingly, a steep magnetization transition region is formed and magnetization is stabilized with a high density compared with the longitudinal magnetic recording method. Therefore, as compared with the longitudinal magnetic recording method, it is possible to enlarge the magnetic particle volume by increasing the film thickness in order to obtain the same recording resolution and to suppress attenuation of recorded magnetization with the passage of time, that is, thermal demagnetization. In addition, since a high recording magnetic field is obtained in combination of a single magnetic pole head and a perpendicular magnetic recording medium including a perpendicular recording layer and a soft magnetic underlayer, it becomes possible to select a material having high anisotropy energy for the perpendicular recording layer. As a result, the thermal demagnetization can be further suppressed.

For a magnetic recording layer of a medium used in the perpendicular magnetic recording method, a granular structure in which a crystal grain is surrounded by a non-magnetic compound, such as an oxide or a nitride, has been proposed. For example, Japanese Patent Publication 2002-342908 ("Patent Document 1") discloses a magnetic recording medium with a recording layer which has a Co—Cr—Pt alloy as a main material and contains an Si oxide, the content of Si being 8 at % or more and 16 at % or less in terms of Si atoms. Furthermore, "Role of Oxygen Incorporation in Co—Cr—Pt—Si—O Perpendicular Magnetic Recording Media", IEEE Transactions on Magnetics, Vol. 40, No. 4. July 2004, pp. 2498-2500, ("Non-patent Document 1") reports that a recording layer made of Co—Cr—Pt—Si—O is formed on a soft magnetic underlayer made of Co—Ta—Zr and having a thickness of 160 nm with a Ta/Ru intermediate layer interposed therebetween and a coercive force is maximized to improve an S/N ratio when the concentration of oxygen in the recording layer is about 15%.

An object of the techniques described above is to improve the signal-to-noise (S/N) ratio by segregating a non-magnetic oxide into a grain boundary to isolate a magnetic particle magnetically. In order to allow a high S/N ratio and thermal stability to be compatible, however, the magnetic anisotropy of magnetic particles needs to be increased. In this case, there has been a problem that the coercive force becomes too high, which makes it difficult for a single magnetic pole head to perform recording.

In order to solve the problem, a structure in which a ferromagnetic alloy layer not containing an oxide is laminated on a recording layer having a granular structure, in which an oxide is segregated into a grain boundary, is proposed. For example, Japanese Patent Publication No. 2004-310910 ("Patent Document 2") discloses a configuration of a perpendicular magnetic recording layer including a layer that contains Co as a main component, and Cr, and does not contain an oxide, and a layer that contains Co as a main component, Pt and an oxide. As compared with the recording layer having the granular structure, the ferromagnetic layer which does not contain an oxide has a high magnetic coupling force between magnetic particles within the ferromagnetic layer, and has a property that magnetization is easily inverted by a magnetic held. By laminating the ferromagnetic layer not containing an oxide on the granular layer, the coercive force of the entire recording layer is reduced. As a result, a perpendicular magnetic recording medium improved in thermal stability, facilitated in recording by using a single magnetic pole head, and having a high S/N ratio can be realized.

Furthermore, in order to improve recording magnetic field gradient in a magnetic head that records information on a perpendicular magnetic recording medium, there has been proposed a magnetic head having a structure in which a magnetic shield is provided on at least a trailing side of a main magnetic pole in the track direction thereof with a non-magnetic gap layer interposed therebetween, in a structure of a known single magnetic pole type head. Hereinafter, the magnetic shield is called a trailing shield and the recording head provided with a trailing shield is called a trailing shield type recording head. For example, an example of the trailing shield type recording head is disclosed in U.S. Patent Publication No. 2002/0176214 ("Patent Document 3") or Japanese Patent Publication No. 2005-190518 ("Patent Document 4"). In the case of the trailing shield type recording head, the recording magnetic field intensity is reduced but the recording magnetic field gradient can be increased. Accordingly, by combination of the trailing shield type recording head and the above-described perpendicular magnetic recording medium, a higher track recording density can be realized.

Moreover, an effort to improve an area recording density by increasing the track density is also made in addition to improving the linear recording density by adopting the above-described perpendicular magnetic recording method. However, as a track pitch decreases, magnetic information items recorded on adjacent tracks interfere with each other. As a result, since a magnetization transition region of a boundary region between the adjacent tracks serves as a noise, a problem that the S/N ratio is decreased becomes noticeable. In addition, writing blur (fringe) caused by the distribution of a magnetic field generated from a recording head becomes noticeable in a recording track end, which causes a problem in that magnetic information of adjacent tracks is eliminated.

A discrete track technique has been drawing attention as a method of solving the problem described above. In the case of a discrete track medium is used, it is possible to physically separate adjacent recording tracks from each other to suppress writing blur at the time of recording and interference between adjacent signals at the time of reproduction, thereby significantly increasing the track density. Discrete track media can be largely divided into two types One is a discrete track medium in which a step difference is provided on a back surface of a magnetic member which records information by performing irregularity processing on a substrate such that a recording track portion which magnetically records information becomes a protruding portion and a guard band portion provided between adjacent recording track portions becomes a recessed portion. Another one is a discrete track medium in Which a part or all of a magnetic member of a guard band portion is cut to make recording into the guard band portion impossible. As a former technique, for example, Japanese Patent Publication No. 2000-195042 ("Patent Document 5") discloses a method of manufacturing a magnetic recording medium, the method comprising the steps of: forming concentric circular irregularities on a substrate by using an etching method; forming sequentially an underlayer, a magnetic layer, a first non-magnetic layer, and a second non-magnetic layer made of Cr, Co—Cr—Pt—Ta alloy, Cr, and SiO2 respectively; and polishing a surface of the second non-magnetic layer having irregularities to make smooth until Cr is exposed. As a latter technique, for example, Japanese Patent Publication No. 9-97419 ("Patent Document 6") discloses a magnetic disk medium comprising a recording track portion, which magnetically records information formed of a magnetic member, and a guard band portion formed of a non-magnetic material between adjacent recording track portion, wherein, in a lower region of the guard band portion, a magnetic member is not provided or a magnetic member different in thickness from that of the recording track portion is provided.

In the methods of manufacturing a discrete medium disclosed in Patent Documents 5 and 6, a protective layer is formed, after a process of forming discrete tracks, by performing a process of filling the guard band portion with a non-magnetic material and a process of making a medium surface flat. These processes are indispensable in order to make a magnetic head stably float and travel above the medium surface at the time of writing and reading. In the above processes, a step difference between the recording track portion and the guard band portion is reduced by removing a superfluous layer formed above a magnetic layer of the recording track portion after the process of filling the non-magnetic material. In addition, in order to make surface roughness of the entire medium surface sufficiently small, a number of processes and an accurate control in each process are required. For example, Japanese Patent Publication No. 2006-196143 ("Patent Document 7") discloses the method of manufacturing a discrete medium in which the surface is made flat by using etching selectivity between a mask layer, which is used for forming a discrete track, and a non-magnetic material filled in the guard band portion. However, in order to uniformly remove the mask layer remaining in the recording track portion while making the step difference, which occurs between a filling material surface of the guard band portion and a recording layer surface of the recording track portion, small on the entire surface of the medium, it is necessary to accurately control the conditions and time of the processes. For this reason, in the known method of manufacturing a discrete track medium, there was a problem that a manufacturing cost noticeably increases due to a reduction in yield caused by an increase in the number of processes and the complexity of processes. This problem occurs, in the known discrete medium, due to a structure in which a step difference occurs between a magnetic layer surface of the recording track portion and an uppermost surface of the guard band portion immediately after the process of forming discrete tracks.

BRIEF SUMMARY OF THE INVENTION

Embodiments of the present invention help to provide a discrete track medium for realizing a high track density in a low price by adopting a configuration, in which filling of a non-magnetic material into a guard band portion and smoothing processing of a medium surface are not required, in a perpendicular magnetic recording medium having discrete tracks.

Figure 1:
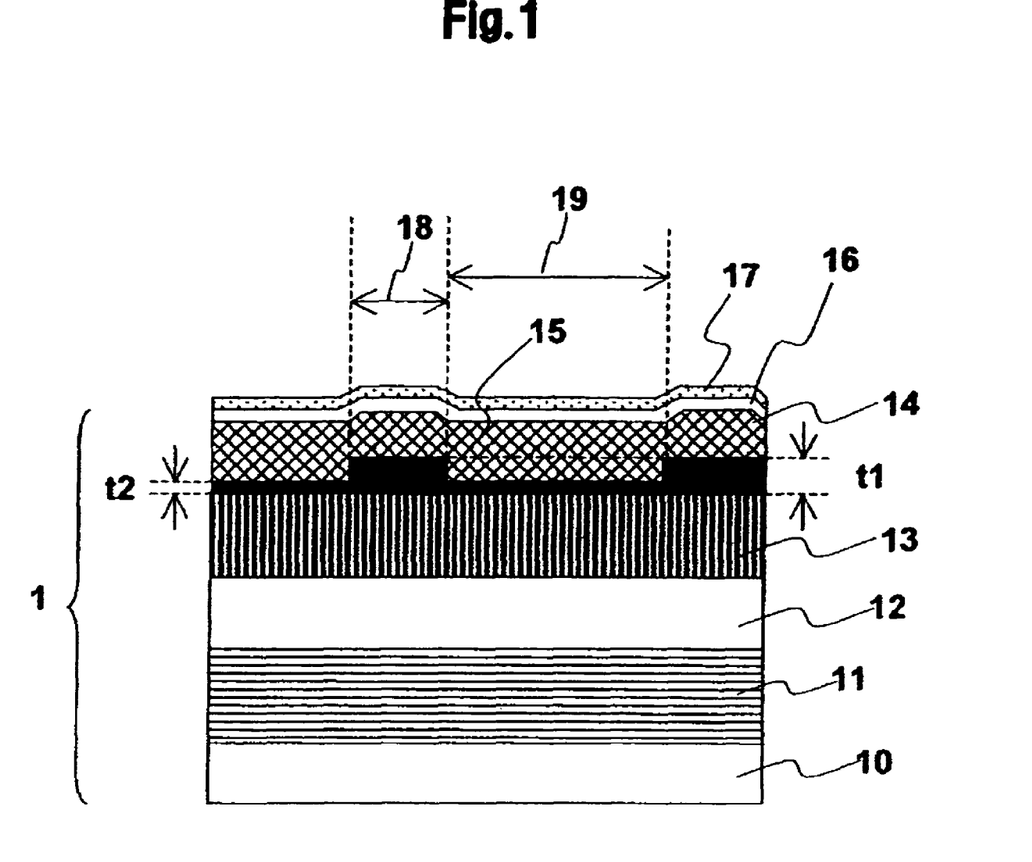
FIG. 1 is a schematic view illustrating a cross-sectional structure of a perpendicular magnetic recording medium according to a first embodiment of the invention.

According to the embodiment of FIG. 1, a perpendicular magnetic recording medium 1, on the non-magnetic substrate 10, includes at least: a soft magnetic underlayer 11; a first recording layer 13 including a crystal grain having a magnetic property and a non-magnetic grain boundary having an oxide, as a main component, surrounding the crystal grain; a second recording layer 14 containing a ferromagnetic metal as a main component and not containing an oxide; and at least one non-magnetic layer 15 provided between the first recording layer and the second recording layer. A recording track portion 19 for magnetically recording information and a guard band portion 18 provided between adjacent recording track portions are included in the perpendicular magnetic recording medium 1. The relationship between the total thickness t1 of the non-magnetic layer in the guard band portion 18 and the total thickness t2 of the non-magnetic layer in the recording track portion 19 is set as t1>t2.

DETAILED DESCRIPTION OF THE INVENTION

Embodiments of the present invention relate to a perpendicular magnetic recording medium, a method of manufacturing the same, and a magnetic recording device in which a perpendicular magnetic recording medium is mounted and in particular, to a perpendicular magnetic recording medium with discrete tracks and a method of manufacturing the same.

It is an object of embodiments of the invention to provide a perpendicular magnetic recording medium, in which it is not necessary to fill a guard band portion with a non-magnetic material, and a method of manufacturing the same.

It is another object of embodiments of the invention to provide a perpendicular magnetic recording medium, in which it is not necessary to fill a guard band portion with a non-magnetic material and a process of making a medium surface flat is not required, and a method of manufacturing the same.

It is still another object of embodiments of the invention to provide a magnetic recording device capable of improving the surface recording density using an inexpensive perpendicular magnetic recording medium.

According to an aspect of embodiments of the invention, a perpendicular magnetic recording medium includes a non-magnetic substrate having thereon at least a soft magnetic underlayer; a first recording layer including a crystal grain having a magnetic property and a non-magnetic grain boundary having an oxide, as a main component, surrounding the crystal grain; and a second recording layer that contains a ferromagnetic metal as a main component and does not contain an oxide. The perpendicular magnetic recording medium has a recording track portion that magnetically records information and a guard band portion provided between adjacent recording track portions. At least one non-magnetic layer is provided between the first recording layer and the second recording layer. The relationship between the total thickness t1 of the non-magnetic layer in the guard band portion and the total thickness t2 of the non-magnetic layer in the recording track portion is t1>t2. In this case, both the thickness of the first recording layer and the second recording layer in the guard band portion are larger than 0. Alternatively, a stricture of t2=0, that is, a non-magnetic layer is not provided in a recording track portion but is provided only in a guard band portion, may be adopted. In addition, it is preferable that a step difference between a surface of the second recording layer in the guard band portion and a surface of the second recording layer in the recording track portion be 2 nm or less, preferably, 1 nm or less.

According to another aspect of embodiments of the invention, there is provided a method of manufacturing a perpendicular magnetic recording medium, the method comprising the steps of: forming a soft magnetic underlayer on a non-magnetic substrate; forming a first recording layer including a crystal grain having a magnetic property and a non-magnetic grain boundary having an oxide, as a main component, surrounding the crystal grain, on the soft magnetic underlayer; forming a non-magnetic layer having a portion corresponding to a recording track portion and a portion corresponding to a guard band portion between recording track portions and having a thickness larger than that of the portion corresponding to the recording track portion, on the first recording layer; forming a second recording layer, which contains a ferromagnetic metal as a main component and does not contain an oxide, on the non-magnetic layer; forming a protective layer on the second recording layer; and forming a lubrication layer on the protective layer.

According to still another aspect of embodiments of the invention, a magnetic recording device is mounted with the above-described perpendicular magnetic recording medium and a magnetic head including a main pole, a coil for magnetizing the main pole, a trailing shield disposed at a trailing side of the main pole, and a read element disposed at a leading side of the main pole.

According to the aspects of embodiments of the invention, since it is not necessary to fill a guard band portion of a discrete track medium with a non-magnetic material, a perpendicular magnetic recording medium capable of performing high-density recording can be provided in a low price. In addition, since smoothing processing of a medium surface is not needed, the price of the discrete track medium can be further reduced. In addition, it is possible to provide a magnetic recording device which realizes a high area recording density by using an inexpensive perpendicular magnetic recording medium.

Hereinafter, a perpendicular magnetic recording medium and a method of manufacturing the same according to embodiments of the invention will be described with reference to the accompanying drawings.

FIG. 1 is a schematic view illustrating a cross-sectional structure of a perpendicular magnetic recording medium according to a first embodiment. A perpendicular magnetic recording medium 1 includes a soft magnetic underlayer 11, a non-magnetic intermediate layer 12, a first recording layer 13 containing an oxide, a second recording layer 14 not containing an oxide, a medium protective layer 16, and a lubrication layer 17 coated on the medium protective layer 16, all of which are provided on a non-magnetic substrate 10. A non-magnetic layer 15 is laminated between the first recording layer 13 and the second recording layer 14. A guard band portion 18 is provided in the perpendicular magnetic recording medium 1, and an interposed portion between the adjacent guard band portions 18 forms a recording track portion 19. The thickness t1 of the non-magnetic layer 15 in the guard band portion 18 is set sufficiently large such that magnetic interaction between the first recording layer 13 and the second recording layer 14 is reduced, thereby making it difficult to occur magnetization reversal caused by a magnetic field from a recording head, in a lower portion of the guard band portion 18. The thickness t2 of the non-magnetic layer 15 in the recording track portion 19 is set preferably in a range in which the magnetization reversal caused by the magnetic field from the recording head becomes easy by the magnetic interaction occurring between the first recording layer 13 and the second recording layer 14. In this case, the relationship of t1>t2 is satisfied. A structure in which t2=0, that is, the non-magnetic layer 15 is provided only in the guard band portion 18 may be adopted.

Next, a first method of manufacturing the perpendicular magnetic recording medium 1 will be schematically described with reference to FIGS. 2(A)-2(G).

Figure 2:
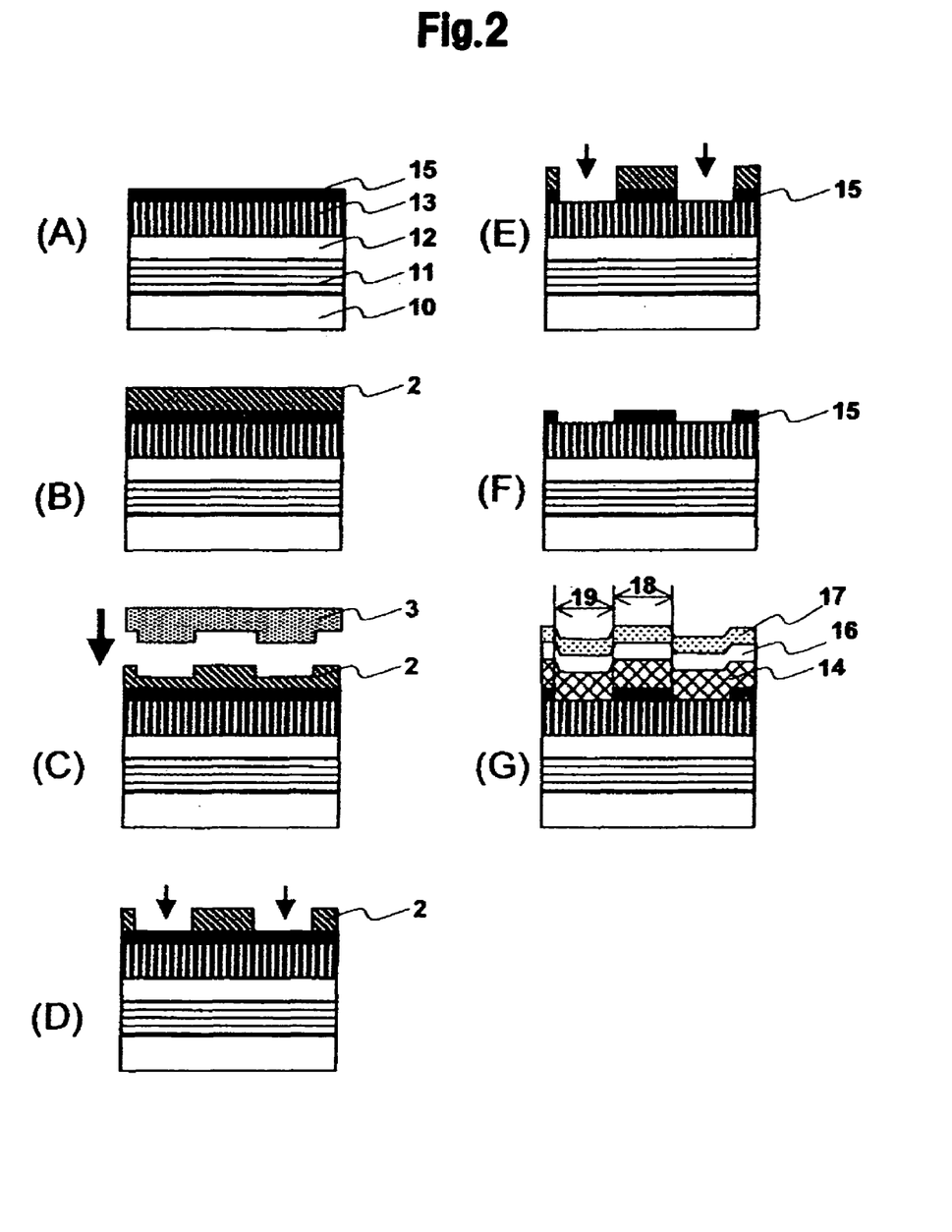
FIGS. 2(A)-2(G) are process views illustrating a first method of manufacturing the perpendicular magnetic recording medium according to the first embodiment of the invention.

First, as shown in FIG. 2(A), the soft magnetic underlayer 11, the non-magnetic intermediate layer 12, the granular recording layer (first recording layer) 13 containing an oxide, and the non-magnetic layer 15 are sequentially formed on the non-magnetic substrate 10 by using a sputtering method, for example.

Then, as shown in FIG. 2(B), a resist 2 is coated on the non-magnetic layer 15.

Subsequently, as shown in FIG. 2(C), a die (stamp) 3 which is formed to have irregularities in order to form a recording track portion and a guard band portion with a desired interval is brought into contact with the resist 2 and is then pressed with high pressure such that the thickness of the resist of a portion for forming the recording track portion 19 is smaller than that of the resist of a portion forming the guard band portion 18 (hereinafter, referred to as an "imprint process").

Then, as shown in FIG. 2(D), a recessed portion of the resist 2 of the portion for forming the recording track portion 19 is removed by using reactive ion etching, for example.

Then, as shown in FIG. 2(E), the non-magnetic layer 15 of the portion for forming the recording track portion 19 is removed with the resist 2 as a mask by ion milling or reactive ion etching, for example. Moreover, although t2 is set to 0 in the above process by completely removing the non-magnetic layer 15 of the portion for forming the recording track portion 19, the non-magnetic layer 15 of the portion for forming the recording track portion 19 may also remain thin in a condition where the relationship of t1>t2 is satisfied, as shown in FIG. 1.

Then, as shown in FIG. 2(F), the resist 2 of the guard band portion is removed by using reactive ion etching, for example.

Then, as shown in FIG. 2(G), the second recording layer 14 and the medium protective layer 16 are formed by using a sputtering method, a CVD method, and the like and then the liquid lubrication layer 17 is coated on the medium protective layer 16.

Next, a second method of manufacturing the perpendicular magnetic recording medium 1 will be schematically described with reference to FIGS. 3(A)-3(G).

Figure 3:
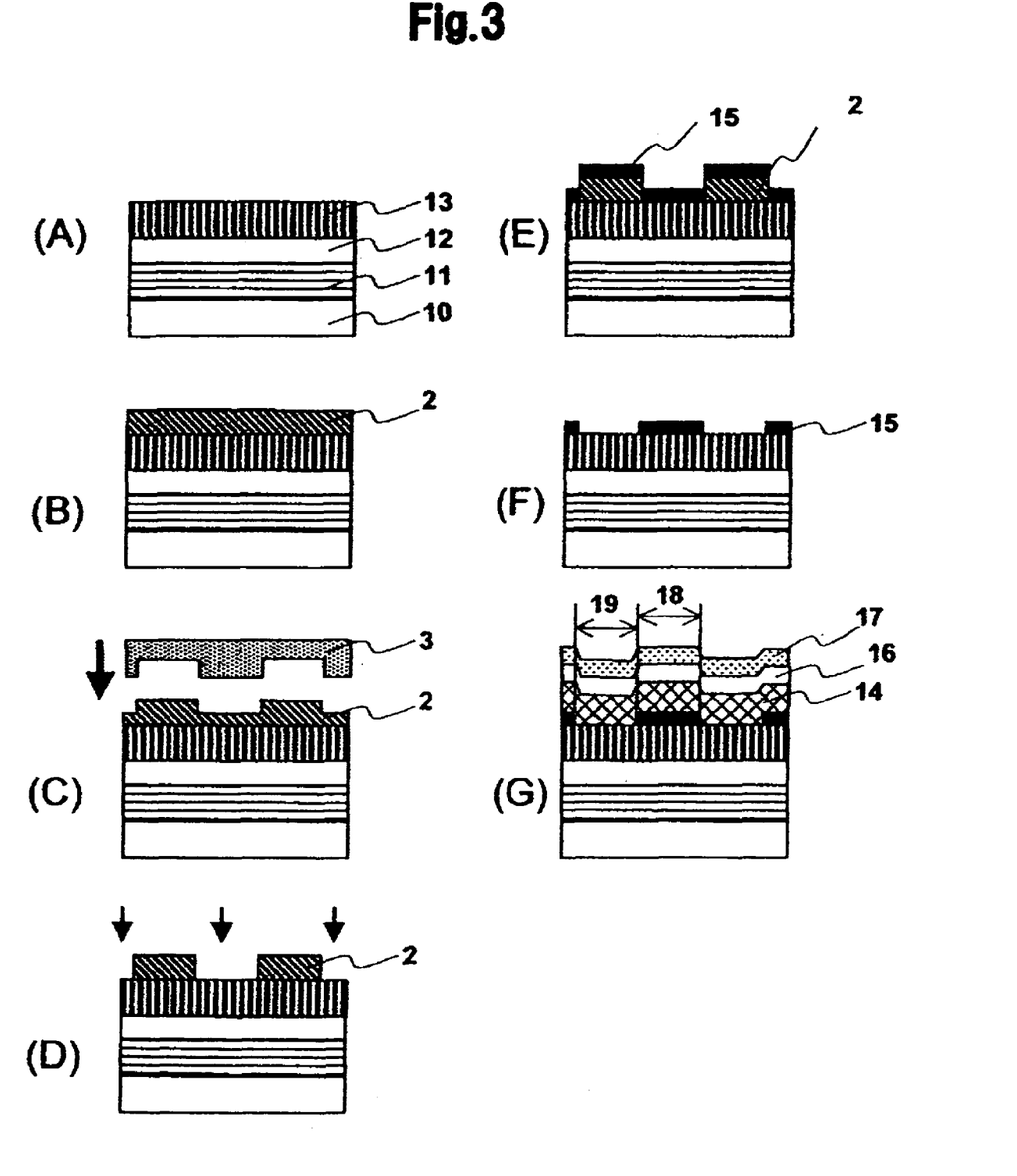
FIGS. 3(A)-3(G) are process views illustrating a second method of manufacturing the perpendicular magnetic recording medium according to the first embodiment of the Invention.

First, as shown in FIG. 3(A), a soft magnetic underlayer 11, a non-magnetic intermediate layer 12, and a granular recording layer (first recording layer) 13 containing an oxide are sequentially formed on a non-magnetic substrate 10 by using a sputtering method, for example.

Then, as shown in FIG. 3(B), a resist 2 is coated on the first recording layer 13.

Then, as shown in FIG. 3(C), the thickness of the resist of a portion for forming the guard band portion 18 is made smaller than that of the resist of a portion for forming the recording track portion 19 in an imprint process.

Then, as shown in FIG. 3(D), a recessed portion of the resist 2 of the portion for forming the guard band portion 18 is removed by using reactive ion etching, for example.

Then, as shown in FIG. 3(E), the non-magnetic layer 15 is formed by using a sputtering method or a CVD method, for example.

Then, as shown in FIG. 3(F), the resist 2 on the recording track portion 19 and the non-magnetic layer 15 are peeled off (hereinafter, referred to as a lift-off process).

Then, as shown in FIG. 3(G), the second recording layer 14 and the medium protective layer 16 are formed by using a sputtering method, a CVD method, for example, and then the liquid lubrication layer 17 is coated on the medium protective layer 16.

Next, details of the manufacturing method will be described.

Examples of a material of the non-magnetic substrate 10 include non-magnetic metal, such as an Al—Mg alloy, crystallized glass, amorphous glass, Si, and a resin. In the first embodiment, a glass substrate having a diameter of 63.5 mm is used.

A soft magnetic material containing Fe, Co, and Ni may be used for the soft magnetic underlayer 11. For example, a CoTaZr alloy, a CoNbZr alloy, or an FeCoB alloy may be used for the soft magnetic underlayer 11. Furthermore, magnetic noises generated from the soft magnetic underlayer can be reduced by adopting a multi-layered structure in which a non-magnetic thin film is interposed between a plurality of soft magnetic thin films and the soft magnetic thin films are coupled in a ferromagnetic or anti-ferromagnetic manner through the non-magnetic thin film. In the first embodiment, an FeCoTaZr alloy layer, an Ru layer, and an FeCoTaZr alloy layer are sequentially formed to have thicknesses of 20 nm, 0.4 nm, and 20 nm, respectively, by using a sputtering method, such that the soft magnetic underlayer 11 is configured to have three layers. The thickness of the soft magnetic underlayer 11 is preferably selected within a range in which a satisfactory overwrite property can be obtained when recording is performed. There is no problem if the thickness of the soft magnetic underlayer 11 is in a range of 10 nm to 300 nm. In addition, a structure in which a magnetic domain control layer, which is formed of FeMn, IrMn, or the like and serves to fix a magnetic domain of the soft magnetic underlayer 11, is provided below the soft magnetic underlayer 11 may also be adopted.

The intermediate layer 12 serves to control crystal orientation of the first recording layer 13 or the diameter of a crystal grain and control exchange coupling between crystal grains. The thickness, configuration, and material of the intermediate layer 12 are preferably set in a range in which the effects described above are obtained and are not particularly limited to those in the first embodiment. In the first embodiment, an NiW layer having a film thickness of 7 nm and an Ru layer having a film thickness of 17 nm are sequentially formed.

In the configuration of the non-magnetic intermediate layer, the NiW layer serves to control the diameter of a crystal grain in the Ru layer and increase c-axis orientation in the direction perpendicular to the film surface. The film thickness is preferably set in a range in which those described above are satisfied, and a value of about 3 nm to 10 nm is desirable. For example, NiCr, NiCrW, or NiV may be used instead of NiW. Alternatively, it may be possible to use Pd, Pt or Cu having a face-centered cubic lattice (fcc) structure or an alloy containing Pd, Pt or Cu. Alternatively, it may be possible to use a ferromagnetic fcc material, such as NiFe, or a material having an amorphous structure, such as NiTa.

The Ru layer serves to control crystal orientation and the diameter of a crystal grain of the first recording layer 13 and reduce exchange coupling between crystal grains. The film thickness is preferably set in a range in which those described above are satisfied, and a value of about 3 nm to 30 nm is desirable. In addition, an alloy containing Ru or a material obtained by adding an oxide, such as $SiO_2$, to Ru may also be used instead of Ru.

The first recording layer 13 is a thin film having a granular structure in which a ferromagnetic particle is surrounded by an oxide and may be formed by using a granular film made of a CoCrPtB alloy, a CoCrPtMo alloy, a CoCrPtNb alloy, a CoCrPtTa alloy, an Si oxide, a Ta oxide, an Nb oxide, a Ti oxide, or a Cr oxide, for example. A granular layer having low noises can be formed by segregating these oxides into the grain boundary. Furthermore, since the first recording layer 13 serves to control anisotropy energy and exchange coupling between crystal grains, the first recording layer 13 may be configured to include a plurality of granular layers having different composition or different oxides. The thickness of the first recording layer 13 is preferably set in a range in which a sufficient overwrite property, a good S/N ratio, and thermal stability are satisfied, and a value of about 8 nm to 20 nm is desirable. When a value in a range of about 300 kA/m to 650 kA/m is used as saturated magnetization of the first recording layer 13, a low noise and thermal stability are compatible, which is preferable. In the first embodiment, the first recording layer 13 is formed of a composite target containing a (Co of 67 at %, Cr of 21 at %, Pt of 18 at %) alloy and $SiO_2$ in a ratio of 94 mol: 6 mol and using a sputtering method in which a mixed gas of argon and oxygen is used. The thickness of the first recording layer 13 is set to 13 nm.

As the resist 2 applied on the non-magnetic layer 15, a photoresist that is widely used industrially may be used. The resist 2 is coated to be uniform and thin by using, for example, a spin coat method or a dipping method, and is then heated to remove an unnecessary organic solvent and the like.

In the stamp 3, a fine track pattern is formed on a metal plate using a method, such as electron beam lithography. The stamp 3 is formed of a material which allows a desired track pattern to be easily formed and which has enough hardness and durability to stand an imprint process. Although an Ni stamp is used in the first embodiment, any kind of material may be used as long as the above object can be realized.

The non-magnetic layer 15 weakens magnetic interaction, which occurs between the first recording layer 13 and the second recording layer 14, to increase a coercive force. thereby making it difficult to occur magnetization reversal caused by the recording magnetic field of the magnetic head. Metals such as Cr, Cu, Ru, Al, Ti, and Ta; alloys such as CoRu, CoCr, CrTi, and CrTa; oxides or nonmetallic materials such as SiO2, AlO3, TiO, Si, and C; may be used as materials of the non-magnetic layer 15. The material of the non-magnetic layer 15 is preferably selected in consideration of etching selectivity between the non-magnetic layer 15 and the first recording layer 13, surface smoothness, corrosion resistance, and the like. In addition, the non-magnetic layer 15 may be configured to include a plurality of layers formed of different materials and having different compositions, and one of the plurality of layers may be used as an etch stop layer when processing the non-magnetic layer 15. In the first embodiment, as the non-magnetic layer 15, SiO2 was formed in the thickness of 1 nm using a sputtering method.

In the first manufacturing method, the non-magnetic layer 15 of the recording track portion 19 is removed by reactive ion etching, for example, by using the resist 2 as a mask, in which a track pattern is formed by imprint processing. Specifically, SiO2 was deposited in the thickness of 1 nm as the non-magnetic layer 15, and the non-magnetic layer 15 of the recording track portion was removed by the reactive ion etching using CF4 gas. In addition, although the non-magnetic layer 15 of the recording track portion 19 was completely removed, the non-magnetic layer 15 of the recording track portion 19 may remain within a range in which the magnetic interaction between the first recording layer 13 and the second recording layer 14 in the recording track portion 19 is large and the magnetization reversal caused by the magnetic field of the head occurs easily.

In the second manufacturing method, the resist 2 of the recording track portion and the non-magnetic layer 15 are peeled off simultaneously by the lift-off process. In this lift-off process, it is possible to select a wet method using organic solvent or a dry method using reactive ion etching under oxygen gas atmosphere.

A CoCr alloy, a CoCrPt alloy, a CoCrB alloy, a CoCrMo alloy, a CoCrNb alloy, a CoCrTa alloy, a CoCrPtB alloy, a CoCrPtMo alloy, a CoCrPtNb alloy, a CoCrPtTa alloy, and the like may be used as a material for forming a layer having ferromagnetic metal as a main component and not containing an oxide, the layer forming the second recording layer 14. In 25 addition, the second recording layer 14 is provided to control exchange coupling with the first recording layer 13 in the recording track portion 19 and may be formed to include a plurality of layers having different composition and materials. The thickness of the second recording layer 14 is preferably set in a range in which a sufficient overwrite property, a good S/N ratio, and thermal stability are satisfied in consideration of combination with the first recording layer 13, and a value of about 3 nm to 10 nm is desirable. In the first embodiment, the second recording layer 14 having a thickness of 4 nm is formed of a alloy target containing Co of 60 at %, Cr of 12 at %, Pt of 16 at %, and B of 12 at % by using a sputtering method.

The magnetic interaction between the first recording layer 13 and the second recording layer 14 is reduced by inserting the non-magnetic layer 15 between the first recording layer 13 of the guard band portion 18 and the second recording layer 14, which increases a coercive force. Accordingly, occurrence of magnetization reversal caused by the magnetic field of the recording head becomes difficult in the guard band portion. As a result, since the magnetic interference to an adjacent recording track is suppressed, the track pitch can be made small.

Figure 4:
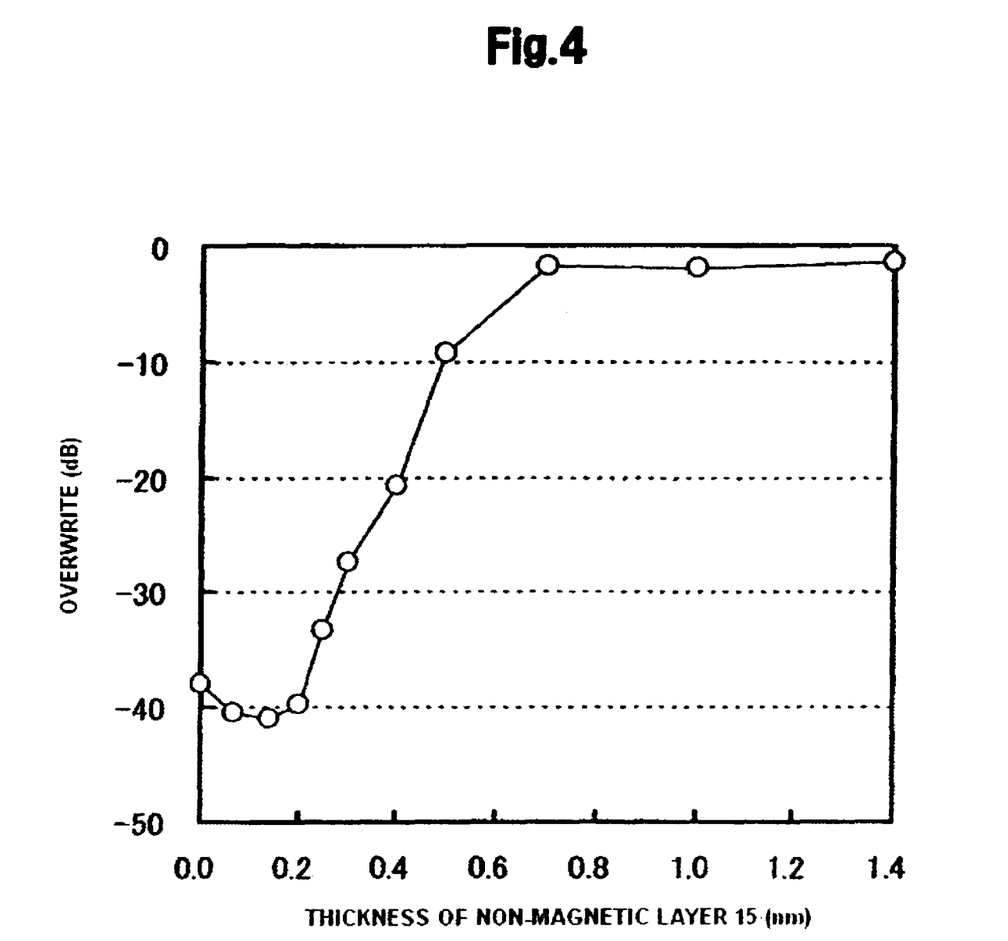
FIG. 4 is a view illustrating the relationship between overwrite and the thickness of a non layer in the perpendicular magnetic recording medium according to the first embodiment of the invention.

FIG. 4 illustrates a change in overwrite when the thickness of the non-magnetic layer 15 of the guard band portion 18 and the recording track portion 19 is changed without performing etching processing on the non-magnetic layer 15 in the perpendicular magnetic recording medium I according to the first embodiment. "Overwrite" is defined as a ratio of a residual output of a base pattern, which is obtained after overwriting a pattern of 3.5 kfr/mm on a base pattern of 20.8 kfr/mm, to an output before overwriting, and is expressed by using "dB" as a unit. That is, the magnetization reversal of the recording layer becomes easy as a value of the overwrite decreases. From the result shown in FIG. 4, it can be seen that a perpendicular magnetic recording medium in which magnetization reversal in the recording track portion 19 is easy and magnetization reversal in the guard band portion 18 is difficult can be obtained by setting the film thickness t1 of the non-magnetic layer 15 of the guard band portion 18 to 0.6 nm or more and the film thickness t2 of the non-magnetic layer 15 of the recording track portion 19 to 0 nm to 0.4 nm, preferably, 0 nm to 0.2 nm in the first embodiment.

After forming the second recording layer 14, the medium protective layer 16 is formed to prevent the recording layer from being damaged by collision with a magnetic head. If a step difference of the second recording layer surface occurring due to a difference between the total film thickness of the guard band portion 18 including the non-magnetic layer 15 and the total film thickness of the recording track portion 19 is 2 nm or less, preferably, 1 nm or less, the medium protective layer 16 may be continuously formed immediately after forming the second recording layer 14 without performing filling of the non-magnetic material or surface smoothing processing. As described above, it is possible to make the step difference of the second recording layer surface equal to or smaller than 2 nm by setting the film thickness t1 of the non-magnetic layer 15 of the guard band portion 18 to 0.6 nm to 2.0 nm and the film thickness t2 of the non-magnetic layer 15 of the recording track portion 19 to 0 nm to 0.4 nm. In addition, in case where the film thickness of the non-magnetic layer 15 is large and a step difference between a surface of the second recording layer 14 of the guard band portion 18 and a surface of the second recording layer 14 of the recording track portion 19 is large, the medium protective layer 16 may be formed after making the step difference small by polishing the surfaces using an etching technique or a chemical mechanical polishing (CMP) method. Since a small distance between a magnetic head and a recording layer at the time of writing and reading is effective in realizing high-density recording, it is preferable that the thickness of the medium protective layer 16 be as thin as possible and be 5 nm or less.

In the first embodiment, a DLC layer having a thickness of 3.5 nm is formed as the medium protective layer 16 using a CVD method.

As lubricant for forming the lubrication layer 17, liquid lubrication used for a current magnetic recording medium may be used. For example, perfluoropolyether, alcohol fluoride, fluorinated carboxylic acid, and the like may be used.

Next, a second embodiment of the invention will be described. The same components as in the first embodiment are denoted by the same reference numerals, and an explanation on a common process will be omitted.

Figure 5:
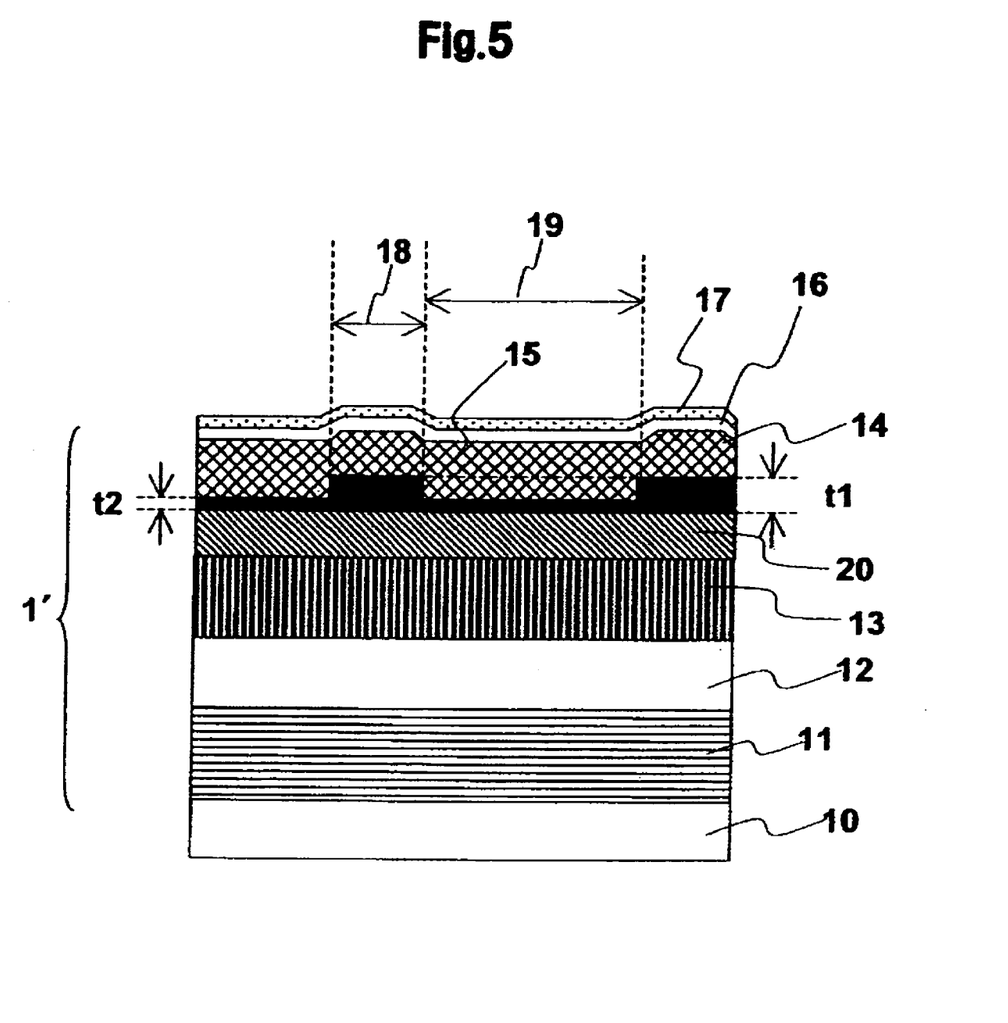
FIG. 5 is a schematic view illustrating a cross-sectional structure of a perpendicular magnetic recording medium according to a second embodiment of the invention.

FIG. 5 is a schematic view illustrating a cross-sectional structure of a perpendicular magnetic recording medium 1' according to the second embodiment. A third recording layer 20 which contains ferromagnetic metal and does not contain an oxide is laminated between a first recording layer 13 and a non-magnetic layer 15. The configuration other than those described above is the same as that of the first embodiment. As shown in FIG. 5, discrete tracks may be formed by inserting the non-magnetic layer 15 between the third recording layer 20 not containing an oxide and a second recording layer 14 in order to increase a coercive force of the guard band portion 18. Similar to the second recording layer 14, a CoCr alloy, a CoCrPt alloy, a CoCrB alloy, a CoCrMo alloy, a CoCrNb alloy, a CoCrTa alloy, a CoCrPtB alloy, a CoCrPtMo alloy, a CoCrPtNb alloy, a CoCrPtTa alloy, and the like may be used as a material of the third recording layer 20. The film thickness of the third recording layer 20 is set in consideration of exchange coupling between the first recording layer 13 and the third recording layer 20 and exchange coupling between the third recording layer 20 and the second recording layer 14. That is, the film thickness of the third recording layer 20 is preferably set in a range in which a coercive force of a magnetic layer including the first recording layer 13 and the third recording layer 20 is high to an extent that recording using a magnetic head is difficult and a coercive force of a magnetic layer including the first recording layer 13, the third recording layer 20, and the second recording layer 14 is low to an extent that recording using the magnetic head is possible. In the second embodiment, the third recording layer 20 with a film thickness of 2 nm is formed of an alloy target containing Co of 72 at % and Cr of 28 at % by using a sputtering method after forming the first recording layer 13 using the same method as the first manufacturing method in the first embodiment. After the process of forming the non-magnetic layer 15, the second recording layer 14 having a thickness of 3 nm is formed of a alloy target containing Co of 60 at %, Cr of 12 at %, Pt of 16 at %, and B of 12 at % by using ,a sputtering method. The other processes are the same as those in the first manufacturing method in the first embodiment.

Figure 6:
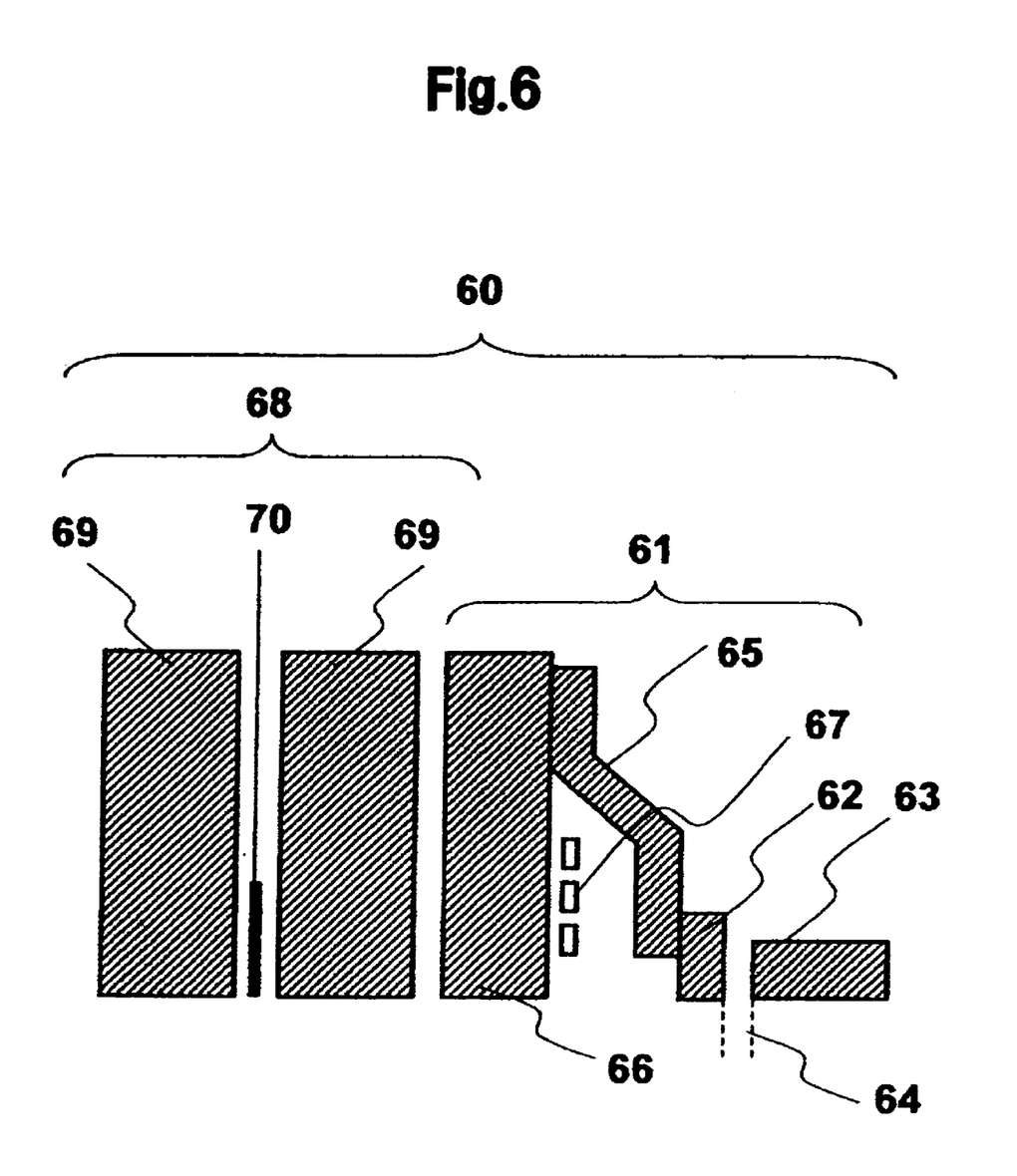
FIG. 6 is a view illustrating the configuration of a magnetic head used in evaluating read/write characteristics of the perpendicular magnetic recording media according to the embodiments of the invention.

Next, read/write characteristics of the perpendicular magnetic recording media according to the first and second embodiments were evaluated. As shown in FIG. 6, a composite head 60 including a trailing shield type recording head 61 and a TMR reproduction head 68 was used as a magnetic head. In the recording head 61, the geometric track width of a front end portion of a main magnetic pole 62 is set to 90 nm. A distance 64 between the main magnetic pole 62 and the trailing shield 63 was set to 50 nm. The height from a medium facing surface (ABS) of the trailing shield 63, which is positioned opposite the main magnetic pole 62 with the trailing gap 64 therebetween, was 100 nm. The main magnetic pole 62 is connected to a yoke 65, and a coil 67 is disposed between the yoke 65 and a sub-magnetic pole 66. The TMR reproduction head 68 includes upper and lower magnetic shields 69 with TMR film 70 provided therebetween. The geometric track width of the TMR film 70 was set to 70 nm.

The read/write characteristics were evaluated by using a spin stand in which a signal processing circuit used in a perpendicular magnetic recording device commercially available was mounted. (Error bit number)/(read bit number) when data is recorded in a recording track portion in a line recording density of 39.4 kbits/mm and 108-bit data is read is set to a bit error rate (BER). In addition, "BER" obtained by recording data in a predetermined recording track portion, performing recording (dummy writing) in all recording track portions adjacent to the predetermined recording track part 10000 times, and then making a measurement again in the predetermined recording track portion was set to BER (BER_ATI) after adjacent track interference. As a ratio of BER to BER_ATI decreases, magnetic interference between adjacent tracks decreases.

Figure 7:
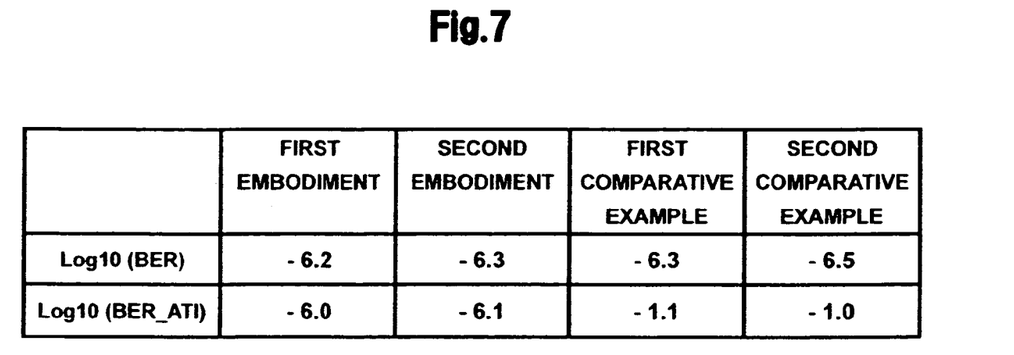
FIG. 7 is a view illustrating results of read/write characteristics in the embodiments and comparative examples of the invention.

FIG. 7 shows results of the read/write characteristics of perpendicular magnetic recording media according to the first and second embodiments and first and second comparative examples. In the first and second embodiments, the width D of the recording track portion 19 was set to 70 nm and the width d of the guard band portion 18 was set to 50 nm. Cases in which the guard band forming processes (FIGS. 2(A) to 2(F) and FIGS. 3(B) to 2(F)) are not performed and the other processes are performed similarly to those in the first and second embodiments are assumed to be the first and second comparative example, respectively.

In the first and second comparative examples, in the case when a guard band portion was not formed, data was eliminated by recording onto an adjacent track. As a result, BER_ATI noticeably deteriorated. On the other hand, in the first and second embodiments, satisfactory results in both BER and BER_ATI were obtained. That is, it was apparent that the same performance as known discrete track media or a higher performance than the known discrete track media was realized.

As described above, according to the first and second embodiments, the perpendicular magnetic recording media having a guard band portion sufficiently serving as a guard band can be realized without performing a process of filling a non-magnetic material and a surface smoothing process by inserting at least one or more non-magnetic layer between the first recording layer and the second recording layer in the guard band portion. That is, a inexpensive perpendicular magnetic recording medium can be obtained. In addition, the perpendicular magnetic recording medium is a discrete track medium and allows a high track density to be realized. Furthermore, since the perpendicular magnetic recording medium according to the second embodiment has the third recording layer 20, the perpendicular magnetic recording medium according to the second embodiment is more excellent than that according to the first embodiment in terms of BER and BER_ATI.

Figure 8:
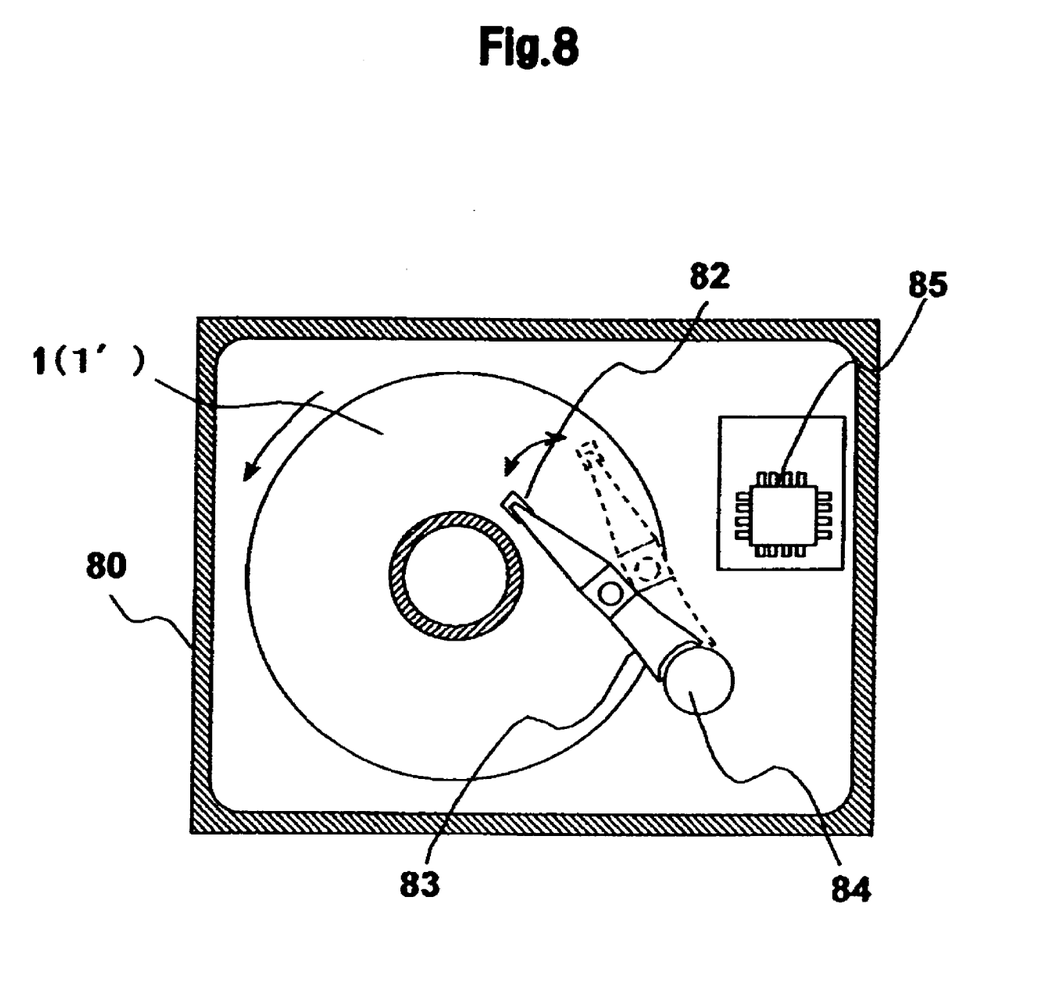
FIG. 8 is a schematic view illustrating the inside of a housing of a magnetic recording device mounted with the perpendicular magnetic recording medium according to the embodiments of the invention, as viewed from a surface of the medium.
Figure 9:
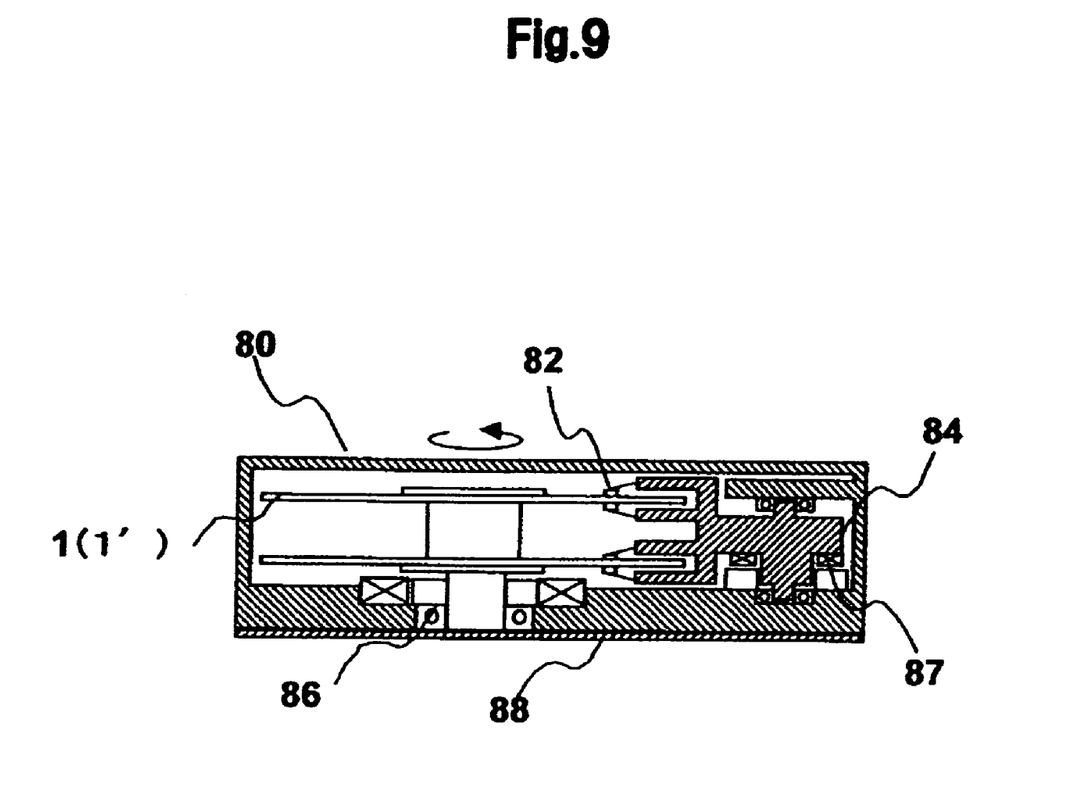
FIG. 9 is a schematic view illustrating the inside of the housing of the magnetic recording device shown in FIG. 8, as viewed from a side surface of the medium.

Next, a magnetic recording device (magnetic disk drive) in which the perpendicular magnetic recording media according to the embodiments of the invention is mounted will be described with reference to FIGS. 8 and 9. FIG. 8 is a schematic view illustrating the inside of a housing as viewed from a medium surface. FIG. 9 is a schematic view illustrating the inside of the housing as viewed from a side surface of the medium. Inside a housing 80, there are provided: the perpendicular magnetic recording medium 1(1') according to the embodiments described above; a spindle motor 86 serving as a unit that supports and rotates the medium 1(1'); a head slider 82 mounted with a magnetic head 60 for reading/writing information from/on the medium 1(1'); a head gimbal assembly 83 having the head slider 82 supported on a front end thereof; a rotary shaft 84 that rotatably supports the head gimbal assembly 83; a voice coil motor (VCM) 87 that rotates the head gimbal assembly 83 through the rotary shaft 84 and performs positioning of the magnetic head 60 on the perpendicular magnetic recording medium 1(1'); and a preamplifier 85. The magnetic head 60 is a composite head which is of the same type as that shown in FIG. 6. The magnetic head 60 includes a trailing shield type recording head 61 and a reproduction bead 68 using a shield type MR read element (for example, a GMR film or a TMR film). A package board 88 on which a signal processing circuit, a disk rotation control circuit, a head positioning control circuit, and the like are mounted is provided in a lower part (outside) of the housing 80. The magnetic head 60 becomes close to a surface of the medium 1(1') so as to be opposite to the surface of the medium 1(1') by making the head slider 82 float and travel in the lowest position on the medium 1(1') that is rotated by the spindle motor 86. The magnetic head 60 is positioned at a predetermined radial position (track) of the perpendicular magnetic recording medium 1(1') by means of the VCM 87 attached to the head gimbal assembly 83. After the magnetic head 60 is positioned on the arbitrary track, information is recorded in the perpendicular magnetic medium 1(1') by using a perpendicular magnetic recording method.

Since the magnetic recording device described above includes the perpendicular magnetic recording medium 1(1') according to the above-described embodiments and the magnetic head 60 having steep magnetic field gradient, a high surface recording density can be realized by using a inexpensive perpendicular magnetic recording medium.

What is claimed is:

1. A perpendicular magnetic recording medium comprising:
    a non-magnetic substrate having thereon at least a soft magnetic underlayer; a first recording layer including a crystal grain having a magnetic property, and a non-magnetic grain boundary having an oxide as a main component surrounding the crystal grain; and a second recording layer containing a ferromagnetic metal as a main component and not containing an oxide;
    the perpendicular magnetic recording medium having a recording track portion for magnetically recording information and a guard band portion provided between adjacent recording track portions,
        wherein at least one non-magnetic layer is provided between the first recording layer and the second recording layer, and
        wherein a relationship between a total thickness t1 of the non-magnetic layer in the guard band portion and a total thickness t2 of the non-magnetic layer in the recording track portion is t1>t2.

2. The perpendicular magnetic recording medium as claimed in claim 1,
    wherein the total thickness t2 of the non-magnetic layer in the recording track portion is 0.

3. The perpendicular magnetic recording medium as claimed in claim 1,
    wherein a step difference between an uppermost surface of the second recording layer in the guard band portion and an uppermost surface of the second recording layer in the recording track portion is 2 nm or less.

4. The perpendicular magnetic recording medium as claimed in claim 1,
    wherein the first recording layer is a granular layer in which one of an Si oxide, a Ta oxide, an Nb oxide, a Ti oxide, and a Cr oxide is contained in a CoCr alloy,
    wherein the second recording layer is a CoCr alloy layer, and
    wherein the non-magnetic layer is formed of at least one material of Cr, Cu, Ru, Al, Ti, Ta, CoRu, CoCr, CrTi, CrTa, SiO2, AlO3, TiO, Si, and C.

5. The perpendicular magnetic recording medium as claimed in claim 1,
    wherein a third recording layer containing a ferromagnetic metal as a main component and not containing an oxide is provided between the first recording layer and the non-magnetic layer.

6. The perpendicular magnetic recording medium as claimed in claim 5,
    wherein the total thickness t2 of the non-magnetic layer in the recording track portion is 0.

7. The perpendicular magnetic recording medium as claimed in claim 5,
    wherein a step difference between an uppermost surface of the second recording layer in the guard band portion and an uppermost surface of the second recording layer in the recording track portion is 2 nm or less.

8. The perpendicular magnetic recording medium as claimed in claim 5,
    wherein the first recording layer is a granular layer in which one of an Si oxide, a Ta oxide, an Nb oxide, a Ti oxide, and a Cr oxide is contained in a CoCr alloy,
    wherein each of the second recording layer and the third recording layer is a CoCr alloy layer, and
    wherein the non-magnetic layer is formed of at least one material of Cr, Cu, Ru, Al, Ti, Ta, CoRu, CoCr, CrTi, CrTa, SiO2, AlO3, TiO, Si, and C.

9. A method of manufacturing a perpendicular magnetic recording medium, the method comprising the steps of:
    forming a soft magnetic underlayer on a non-magnetic substrate;
    forming a first recording layer including a crystal grain having a magnetic property and a non-magnetic grain boundary having an oxide, as a main component, surrounding the crystal grain, on the soft magnetic underlayer;
    forming a non-magnetic layer having a portion corresponding to a recording track portion and a portion corresponding to a guard band portion between recording track portions and having a thickness larger than that of the portion corresponding to the recording track portion, on the first recording layer;
    forming a second recording layer containing a ferromagnetic metal as a main component and not containing an oxide, on the non-magnetic layer;
    forming a protective layer on the second recording layer; and
    forming a lubrication layer on the protective layer.

10. The method of manufacturing a perpendicular magnetic recording medium as claimed in claim 9,
    wherein the forming of the non-magnetic layer having the portion corresponding to the recording track portion and the portion corresponding to the guard band portion comprises the steps of:
    forming a non-magnetic layer on the first recording layer;
    applying a resist on the non-magnetic layer;
    pressing a stamp, which has irregularities corresponding to the recording track portion and the guard band portion, on the resist applied;
    removing a recessed portion (portion that forms the recording track portion) of the resist in which the irregularities are formed by the pressing;
    removing the non-magnetic layer of the portion, which forms the recording track portion, by etching using the resist as a mask; and removing the resist on the non-magnetic layer which remains in the above processes.

11. The method of manufacturing a perpendicular magnetic recording medium as claimed in claim 9,
wherein the forming of the non-magnetic layer having the portion corresponding to the recording track portion and the portion corresponding to the guard band portion comprises the steps of:
applying a resist on the first recording layer;
pressing a stamp, which has irregularities corresponding to the guard band portion and the recording track portion, on the resist applied;
removing a recessed portion (portion that forms the guard band portion) of the resist in which the irregularities are formed by the pressing;
removing the non-magnetic layer by using the resist as a mask; and
removing the mask of the resist and the non-magnetic layer formed thereon.

12. A magnetic recording device comprising:
a perpendicular magnetic recording medium including a non-magnetic substrate having thereon at least a soft magnetic underlayer; a first recording layer including a crystal grain having a magnetic property and a non-magnetic grain boundary having an oxide, as a main component, surrounding the crystal grain; and a second recording layer containing a ferromagnetic metal as a main component and not containing an oxide, the perpendicular magnetic recording medium having a recording track portion for magnetically recording information and a guard band portion provided between adjacent recording track portions, in which at least one non-magnetic layer is provided between the first recording layer and the second recording layer, and a relationship between a total thickness t1 of the non-magnetic layer in the guard band portion and a total thickness t2 of the non-magnetic layer in the recording track portion is $t1 > t2$; and
a magnetic head including a main pole, a coil for magnetizing the main pole, a trailing shield disposed at a trailing side of the main pole, and a read element disposed at a leading side of the main pole.

13. The magnetic recording device as claimed in claim 12, wherein the total thickness t2 of the non-magnetic layer in the recording track portion of the perpendicular magnetic recording medium is 0.

14. The magnetic recording device as claimed in claim 12, wherein a step difference between an uppermost surface of the second recording layer in the guard band portion of the perpendicular magnetic recording medium and an uppermost surface of the second recording layer in the recording track portion is 2 nm or less.

15. The magnetic recording device as claimed in claim 12, wherein the first recording layer of the perpendicular magnetic recording medium is a granular layer in which one of an Si oxide, a Ta oxide, an Nb oxide, a Ti oxide, and a Cr oxide is contained in a CoCr alloy,
wherein the second recording layer is a CoCr alloy layer, and
wherein the non-magnetic layer is formed of at least one material of Cr, Cu, Ru, Al, Ti, Ta, CoRu, CoCr, CrTi, CrTa, SiO2, AlO3, TiO, Si, and C.

16. The magnetic recording device as claimed in claim 12, wherein a third recording layer containing a ferromagnetic metal as a main component and not containing an oxide is provided between the first recording layer and the non-magnetic layer of the perpendicular magnetic recording medium.

* * * * *